United States Patent Office 2,947,578
Patented Aug. 2, 1960

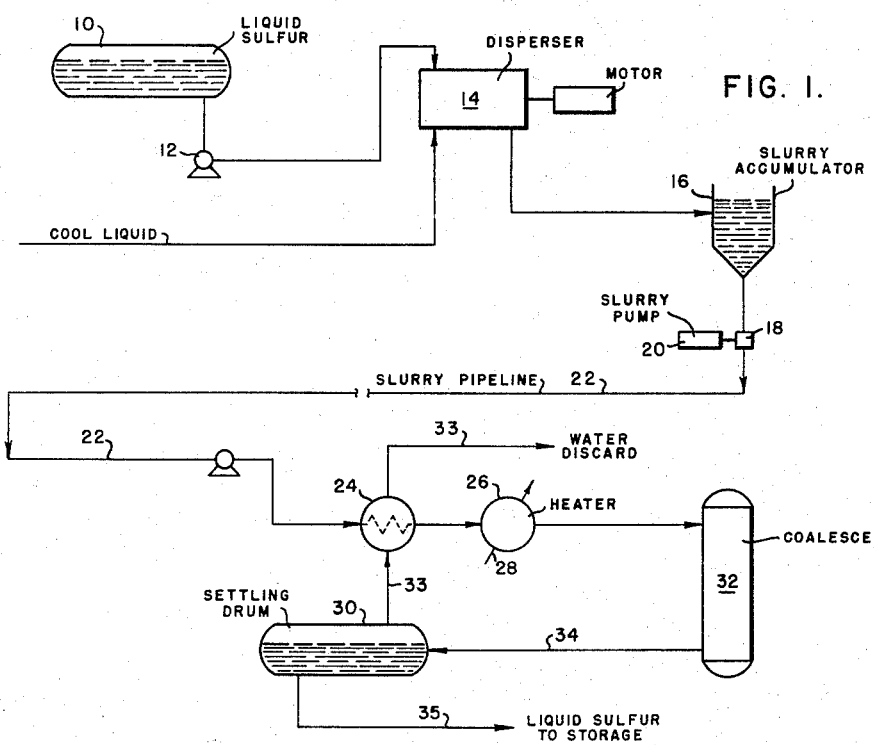
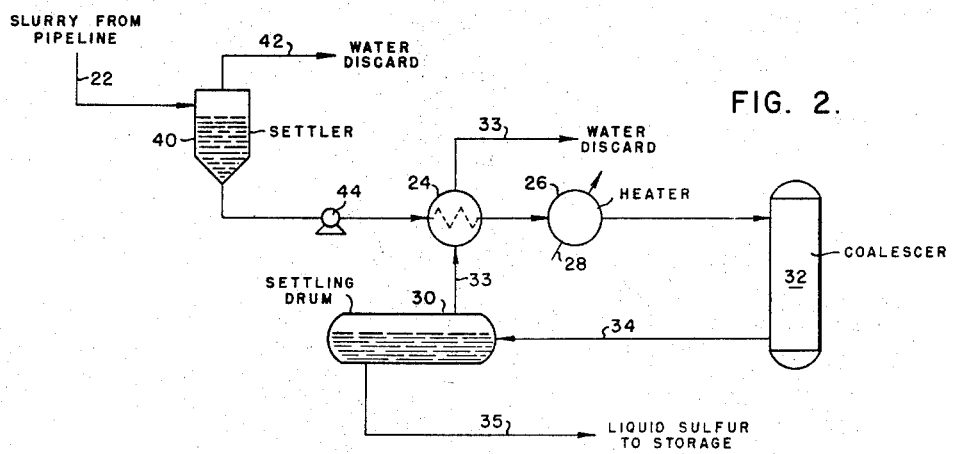

2,947,578

PROCEDURE FOR TRANSPORTING SULPHUR

Hampton G. Corneil, Baytown, and Henry H. Meredith, Jr., Tyler, Tex., assignors to Humble Oil & Refining Company Filed Sept. 20, 1957, Ser. No. 685,123

7 Claims. (Cl. 302—66)

This invention relates to the production and mining of sulphur. More particularly, the invention relates to a novel method of transporting sulphur from the area of production to a remote area.

Most of the sulphur produced in the United States is mined on the Texas and Louisiana Gulf Coast by the Frasch process. The sulphur occurs in the earth as a deposit on the top of the numerous salt domes found in the area. There are also many sulphur deposits on the mainland but are located in swamps or marsh areas that cannot be reached by railroad. Although barge transportation can be used in these areas, the use of this system of transportation is expensive, it is unreliable in stormy weather, and is intermittent, thereby requiring substantial storage facilities at the mine to permit accumulating barge loadings.

This invention contemplates an improved system of transporting sulphur from the mining areas to distant areas on the mainland. The system utilizes a pipeline system for pumping the sulphur to the distant locations. However, such a pipeline system must overcome many difficulties encountered. For example, the sulphur produced by the Frasch process is pumped up from the borehole in liquid form after the sulphur has been heated by means such as hot water. It is desirable that the sulphur also be stored in fluid form or allowed to solidify in large storage vats. Since sulphur solidifies at about 243° F., it will become a solid at normal temperatures and can only be moved a short distance as a liquid unless kept in a heated condition. The pipelines for handling liquid sulphur would require careful insulation and steam tracing to minimize heat losses. The cost of such a construction would be excessive.

The new sulphur transportation system described herein overcomes the foregoing difficulties by providing a slurry of finely divided solid sulphur suspended in a liquid at the point of production by charging the sulphur and liquid to a disperser. The slurry is then pumped to the distant location. At the distant location the slurry is heated to melt the sulphur and then the melted sulphur is collected.

The invention can be further understood by the following detailed description when taken in conjunction with the following figures in which:

Fig. 1 is a flow diagram of the system; and Fig. 2 is a slightly modified system.

As formerly stated, the sulphur is usually produced in liquid form by means of the Frasch process. The sulphur so produced may be fed to a tank 10 which is heated to maintain the liquid sulphur in a free-flowing condition. Sulphur has the peculiar property of remaining free-flowing in the temperature range from about 243° F. to 320° F., the melting point being at about 243° F. Above 320° F. the sulphur becomes so viscous it will not flow easily. The liquid sulphur therefore must be maintained between the 243° F. to 320° F. range. We prefer to maintain the sulphur at approximately 275° F. When kept at this temperature, the sulphur may be pumped some distance and while being pumped will be less likely to cool to a solidified state then it would at a lower temperature.

The liquid sulphur from tank 10 is pumped by means of pump 12 to a disperser 14. A cool liquid such as water is also pumped to the disperser 14 by means of a separate line. The water is at its normal temperature in the range of 70° to 100° F.

The disperser used to prepare the mixture of finely divided solid sulphur suspended in water can be any of the usual devices for mixing two materials to prepare finely divided particles of sulphur in a continuous phase in the water. These machines usually employ mechanical mixing equipment. However, the desired mixing can be effected by injecting the sulphur into a high velocity stream of water using the turbulence at an orifice or a throttle valve as a mixing means.

The slurry is then pumped to a slurry accumulator 16 and the accumulated slurry is pumped by means of a pump 18 operated by motor 20 through the slurry pipeline 22.

The pipeline 22 must, of necessity, be quite long, in many cases several miles in length, in order to reach a distant location for storage. It is therefore necessary to maintain a sufficient velocity in the pipeline to prevent settling of the sulphur particles within the pipeline 22. Since sulphur has a specific gravity of around 2.00, it will have a tendency to settle unless the particles are made sufficiently small in diameter and a sufficient linear velocity is developed within the pipeline. For a pipeline of 7.625 inches inside diameter, we have found that a slurry velocity of 3.2 ft./sec. is adequate for satisfactory operation when the sulphur particles have a maximum diameter of 0.015 inch. The slurry would consist of one part of sulphur and one part of water on a weight basis. For a pipeline of 33 miles in length operated under these conditions, the pressure drop would total some 900 pounds per square inch.

The following conditions describe one way of employing the slurry-pipeline system:

| | |
|---|---|
| Sulphur flow rate | 1,600 LT/D. |
| Water flow rate | 1,600 LT/D. |
| Slurry flow rate | 3,200 LT/D. |
| Water temperature to disperser | 100° F. |
| Sulphur temperature to disperser | 275° F. |
| Slurry temperature from disperser | 149° F. |
| Maximum diameter of particles from disperser | 0.015 inch. |
| Length of pipeline | 33 miles. |
| Inside diameter of pipeline | 7.625 inches. |
| Slurry velocity in pipeline | 3.2 ft./sec. |
| Operating temperature of pipeline | 70° F. |
| Temperature of heated slurry at end of pipeline | 275° F. |
| Pressure on slurry heating equipment at end of pipeline | 50 p.s.i.g. |
| Pressure at inlet of pipeline | 900 p.s.i.g |
| Pressure at end of pipeline | 0 p.s.i.g |
| Pressure drop across the 33 miles of pipeline | 900 p.s.i.g |

The slurry temperature from the disperser under the above conditions is about 149° F. It may be desirable the cool the slurry before feeding it to the pipeline. For this purpose a heat exchange cooler (not shown) can be used.

At the distant location the slurry is heated by means of a heat exchanger 24 and heater 26 supplied with steam through steam conduits 28. The heat exchanger 24 and heater 26 are maintained at a pressure sufficient to melt the sulphur without vaporizing the water phase of the slurry. It is necessary to prevent vaporization of the water because vaporization of the water will in most cases cause a breakdown of bicarbonate ions to carbonate ions with the subsequent precipitation of calcium carbonate and/or magnesium hydroxide. The pressure therefore is necessary to prevent the reaction which results in the forming of the calcium carbonate and/or magnesium hydroxide precipitate. This pressure, of course, must be greater than the vapor pressure of the water contained in the slurry and hence should be greater than 27 p.s.i.a. if heated to 275° F. We prefer to use a pressure at the heat exchanger 24 of about 40 p.s.i.a., thus allowing for a drop of pressure as the sulphur flows from the heat exchanger to a settling drum 30 while maintaining the pressure within the settling drum about 27 p.s.i.a.

It has been found in practice that a small portion of the suspended sulphur particles are so small in diameter that they will not coalesce with one another readily. To recover these small diameter sulphur particles, a coalescer 32 may be included to receive the melted sulphur and water from the heater 26. The water and the coalesced sulphur will then flow through line 34 to the settling drum 30.

The water phase in settling drum 30 is conducted to the heat exchanger 24 and discarded through line 33. The liquid sulphur phase may be conducted through line 35 to a place of storage.

The hot water from settling drum 30 serves to heat the slurry from pipeline 22 in the heat exchanger 24. As previously stated, the sulphur must be maintained in the temperature range between 243° and 320° F. We prefer to maintain the sulphur at about 275° F. in the recovery system as well as in the area of production.

Fig. 2 shows a slightly modified form of transportation system utilizing the principles of our new invention. The embodiment shown in Fig. 2 utilizes a settler 40 for discarding some of the water from the slurry prior to the recovery of the melted sulphur from the slurry. This is possible because the amount of water needed to form the slurry is much greater than the amount of water needed to recover the sulphur. By utilizing the settler 40, some of the water is discarded through line 42 prior to the feeding of slurry to the heat exchanger 24 by means of a pump 44.

Any suitable liquid for transporting the sulphur through the pipeline 22 may be used in the described procedure. However, water is the preferred carrier liquid. Sulphur is insoluble in water and no chemical reaction occurs between the sulphur and water. Fresh water, brackish water, or sea water may be used. However, when water and sulphur and the steel of the pipelines are in contact, the sulphur causes corrosion of the steel. Therefore, chemicals may be added to the water to reduce the corrosivity of the water. These chemicals may be corrosion inhibitors or acids or alkalies to change the alkalinity or acidity of the water. Also, the pipeline may be lined with concrete, plastic, corrosion resistant metals, etc. to eliminate the effects of corrosion. Concrete lining is particularly effective, is easy to install, and is economical to use.

If brackish water or sea water is used, the water may tend to form barnacles or other marine growth in the pipeline. The water can be treated before its use in the slurry process, to kill the marine organisms. Such treatment may be chlorination or heating the water to kill the growths by sterilization.

What is claimed is:

1. A process for transporting sulphur to a distant location from the point of its production comprising the steps of preparing a slurry of finely divided solid sulphur in water at the point of production by charging the sulphur and water to a disperser to provide sulphur particles sufficiently small to prevent settling of the sulphur particles under pumping conditions, pumping the slurry to the distant location, heating the slurry to melt the sulphur, and settling the melted sulphur from the water.

2. A process in accordance with claim 1 wherein the finely divided solid sulphur has a maximum diameter of about 0.015 inch.

3. A process for transporting sulphur to a distant location from the point of its production in melted form comprising the steps of feeding the melted sulphur at a temperature permitting easy flow of the sulphur and water to a disperser to provide a slurry of finely divided sulphur particles suspended in the water, pumping the slurry to the distant location, heating the slurry at the distant location to a temperature providing free flowing sulphur, and feeding the water sulphur to a settling drum.

4. A process for transporting sulphur to a distant location from the point of its production in melted form comprising the steps of feeding the melted sulphur at a temperature permitting easy flow of the sulphur and water to a disperser to provide a slurry of finely divided solid sulphur particles suspended in water, pumping the slurry to the distant location through a pipeline at a velocity sufficient to prevent settling of the sulphur particles in the pipeline, heating the slurry at the distant location to a temperature providing free flowing sulphur and at a pressure sufficient to melt the sulphur without vaporizing said water, feeding the resulting melted sulphur and said water to a settling drum pressurized to prevent vaporization of said water, discarding the water from the settling drum, and feeding the melted sulphur to a place of storage.

5. A process for transporting sulphur to a distant location from the point of its production in melted form comprising the steps of feeding the melted sulphur at a temperature below 320° F. and also feeding water to a disperser to provide a slurry of finely divided sulphur particles having a maximum diameter of 0.015 inch suspended in water, pumping the slurry to the distant location through a pipeline at a velocity sufficient to prevent settling of the sulphur particles in the pipeline, heating the slurry at the distant location to a temperature below 320° F. and at a pressure sufficient to melt the sulphur without vaporizing the water, feeding the resulting liquid sulphur and water to a settling drum pressurized to prevent vaporization of the water, discarding the water from the settling drum, and feeding the liquid sulphur to a place of storage.

6. A process for transporting sulphur to a distant location from the point of its production in melted form comprising the steps of feeding the melted sulphur at a temperature of about 275° F. and water at a temperature low enough to cause solidification of the sulphur to a disperser to provide a slurry of finely divided sulphur particles having a maximum diameter of 0.015 inch suspended in water, pumping the slurry to the distant location through a pipeline a velocity sufficient to prevent settling of the sulphur particles in the pipeline, heating the slurry at the distant location to about 275° F. and at a pressure sufficient to melt the suphur without vaporizing the water, feeding the resulting liquid sulphur and water to a settling drum pressurized to prevent vaporization of the water, discarding the water from the settling drum, and feeding the 275° F. liquid sulphur to a place of storage.

7. A process for transporting sulphur to a distant location from the point of its production in melted form comprising the steps of feeding the melted sulphur at a temperature of about 275° F. and water at a temperature in the range of 50° to 100° F. to a disperser to provide a slurry of finely divided sulphur particles having a maximum diameter of 0.015 inch suspended in water, pumping the slurry to the distant location through a pipeline at a velocity sufficient to prevent settling of the sulphur particles in the pipeline, heating the slurry at the distant location to about 275° F. and at a pressure sufficient to melt the sulphur without vaporizing the water, passing the melted sulphur and the water to a coalescer to coagulate the liquid droplets of sulphur, feeding the resuling liquid sulphur and water to a settling drum pressurized to prevent vaporization of the water, discarding the water from the settling drum, and feeding the 275° F. liquid sulphur to a place of storage.

References Cited in the file of this patent

UNITED STATES PATENTS

| | | |
|---|---|---|
| 2,421,968 | Schutte | June 10, 1947 |
| 2,798,772 | Redcay | July 9, 1957 |
| 2,809,885 | Ditman | Oct. 15, 1957 |
| 2,863,732 | Bowers | Dec. 9, 1958 |